United States Patent

[11] 3,581,632

[72] Inventor Norman John Gatter
Norbury, London, England
[21] Appl No 775,743
[22] Filed Nov. 14, 1968
[45] Patented June 1, 1971
[73] Assignee Triggs & Gatter Limited
London, England

[54] PHOTOTYPESETTING
19 Claims, 22 Drawing Figs.

[52] U.S. Cl. 95/4.5
[51] Int. Cl. B41b 15/04
[50] Field of Search 95/4.5

[56] References Cited
UNITED STATES PATENTS

| | | | |
|---|---|---|---|
| 2,709,952 | 6/1955 | Brock | 95/4.5 |
| 2,742,830 | 4/1956 | Wirtz | 95/4.5 |
| 2,790,362 | 4/1957 | Higonnet et al. | 95/4.5 |
| 3,434,402 | 3/1969 | McCall | 95/4.5 |

*Primary Examiner*—Samuel S. Matthews
*Assistant Examiner*—M. .L. Gellner
*Attorney*—Woodhams, Blanchard and Flynn ABSTRACT: A phototypesetting machine in which letter-spacing control is effected by moving a photosensitive surface a desired distance prior to exposure of a character in response to an output from a photosensitive scanner which scans an image of a control marking for the character, and the output from the scanner controls an electromechanically operated transport mechanism for the photosensitive surface.

INVENTOR
NORMAN JOHN GATTER
BY
Woodhams, Blanchard & Flynn
ATTORNEYS

INVENTOR
NORMAN JOHN GATTER
BY
Woodhams, Blanchard & Flynn
ATTORNEYS

INVENTOR
NORMAN JOHN GATTER
BY
Nordblom, Blanchard & Flynn
ATTORNEYS

INVENTOR
NORMAN JOHN GATTER
BY Woodhams, Blanchard & Flynn
ATTORNEYS

INVENTOR
NORMAN JOHN GATTER
BY
Woodhams, Blanchard & Flynn
ATTORNEYS

INVENTOR
NORMAN JOHN GATTER
BY
Woodhams, Blanchard & Flynn
ATTORNEYS

INVENTOR
NORMAN JOHN GATTER
BY
Woodhams, Blanchard & Flynn
ATTORNEYS

Patented June 1, 1971 3,581,632

13 Sheets-Sheet 8

INVENTOR
NORMAN JOHN GATTER
BY
Woodhams, Blanchard & Flynn
ATTORNEYS

INVENTOR
NORMAN JOHN GATTER
BY
Woodhams, Blanchard & Flynn
ATTORNEYS

Patented June 1, 1971 3,581,632

13 Sheets-Sheet 10

INVENTOR
NORMAN JOHN GATTER
BY
Woodham, Blanchard & Flynn
ATTORNEYS

INVENTOR
NORMAN JOHN GATTER
BY
Woodhams, Blanchard & Flynn
ATTORNEYS

INVENTOR
NORMAN JOHN GATTER
BY
Woodhams, Blanchard & Flynn
ATTORNEYS

INVENTOR
NORMAN JOHN GATTER
BY
Woodhams, Blanchard & Flynn
ATTORNEYS

PHOTOTYPESETTING

The invention relates to a letter spacing control for a phototypesetting machine, in which light is projected through an optical font and focused, letter by letter, on a piece of photosensitive material. One problem with this method of typesetting is to ensure correct spacing of the letters. Various means have been used to overcome this problem. For example, the photosensitive material may be of a kind which develops a visible image rapidly during or immediately after exposure, so that a visible image is formed of the characters previously exposed.

Alternatively, the photosensitive material may be covered with a hinged foil having a fluorescent surface which shows a visible image for a short time. Each character is then positioned on the foil before making the exposure on the photosensitive material.

Both these methods of letter spacing control are not without disadvantages. It is an object of the invention to provide an alternative form of letter spacing control for phototypesetting.

It is also an object of the invention to provide means whereby a desired character may be selected for printing in response to an electrical input signal.

Various other objects and features of the invention will be best understood from the following description of preferred embodiments of the invention, which are described and illustrated, by way of example only, with reference to the accompanying drawing, in which.

Figure 3A:
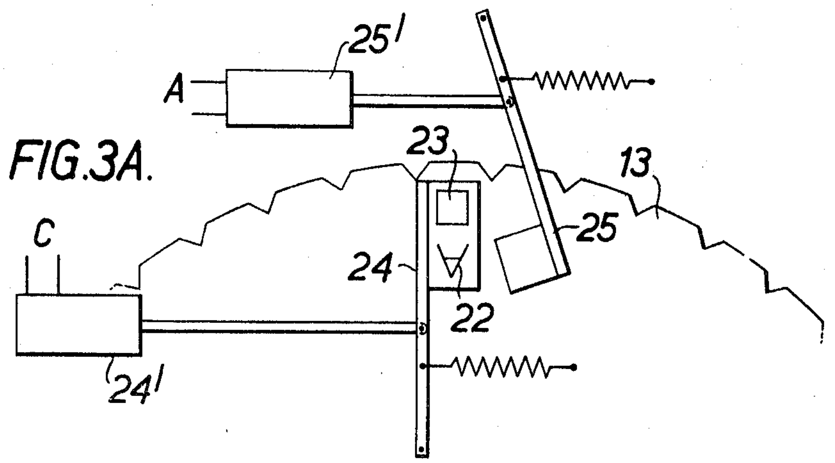
Figure 3B:
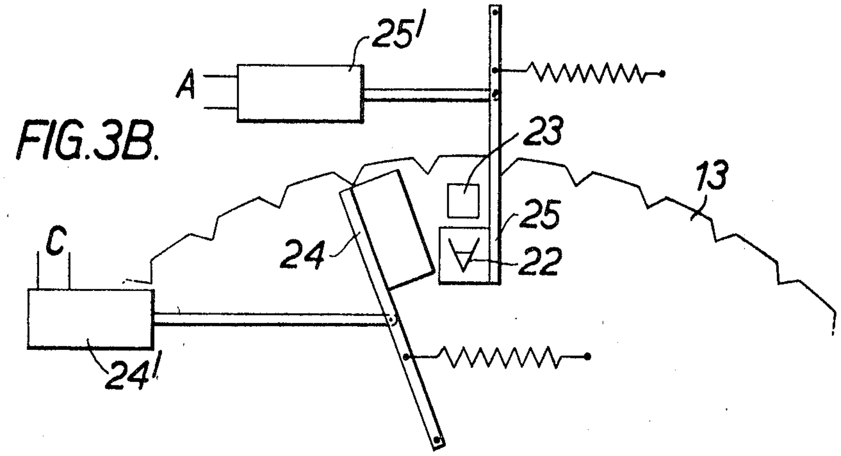
Figure 3C:
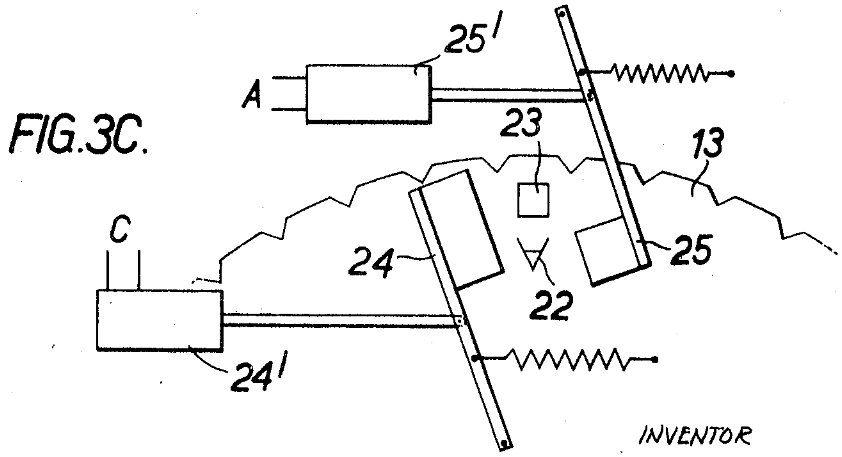
Figure 4:
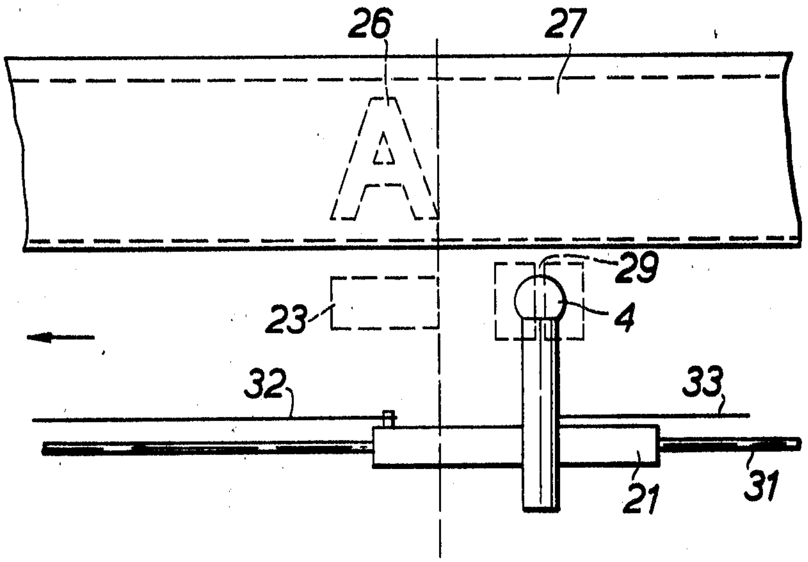
Figure 6:
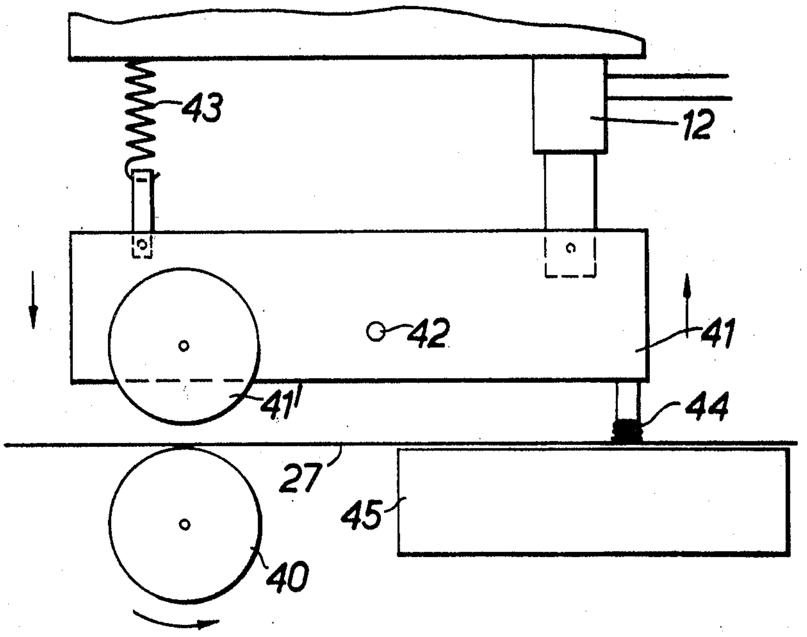
Figure 5:
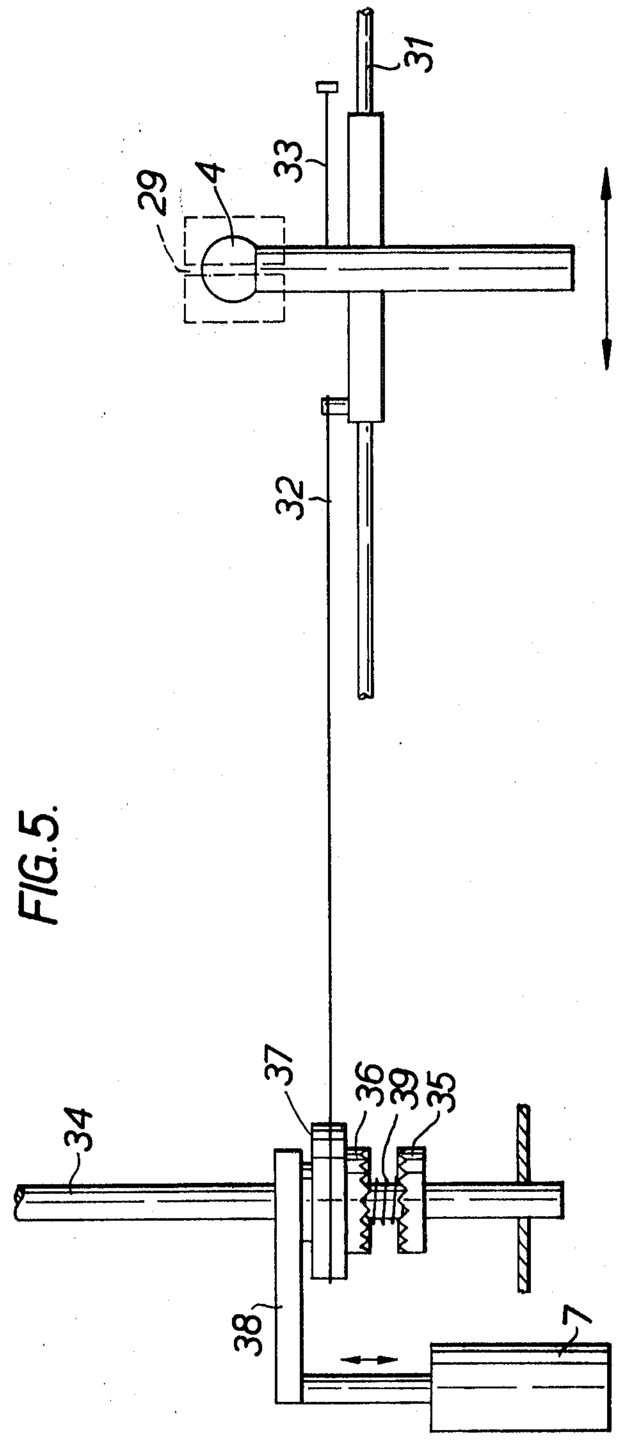
Figure 7:
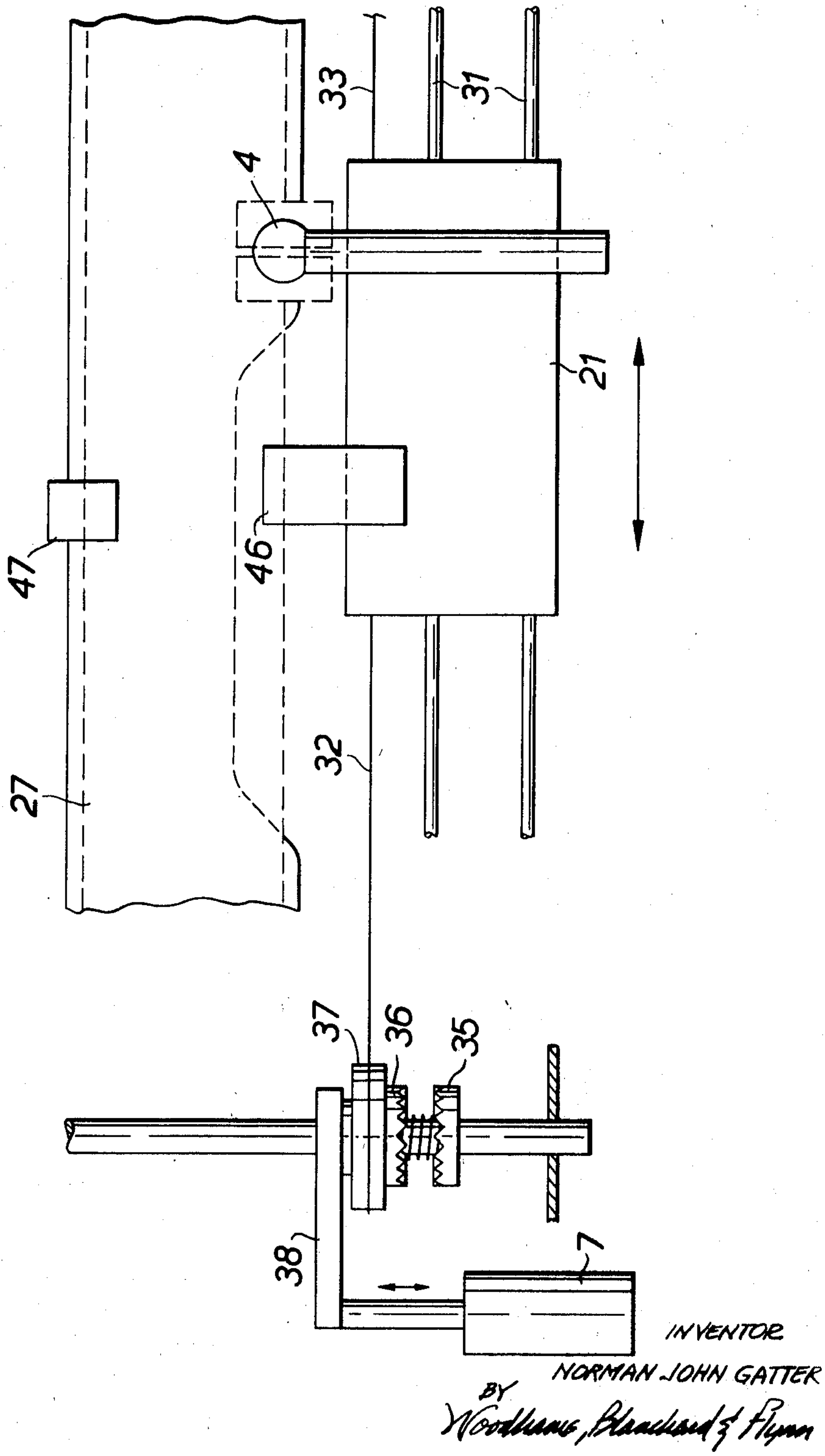
Figure 8:
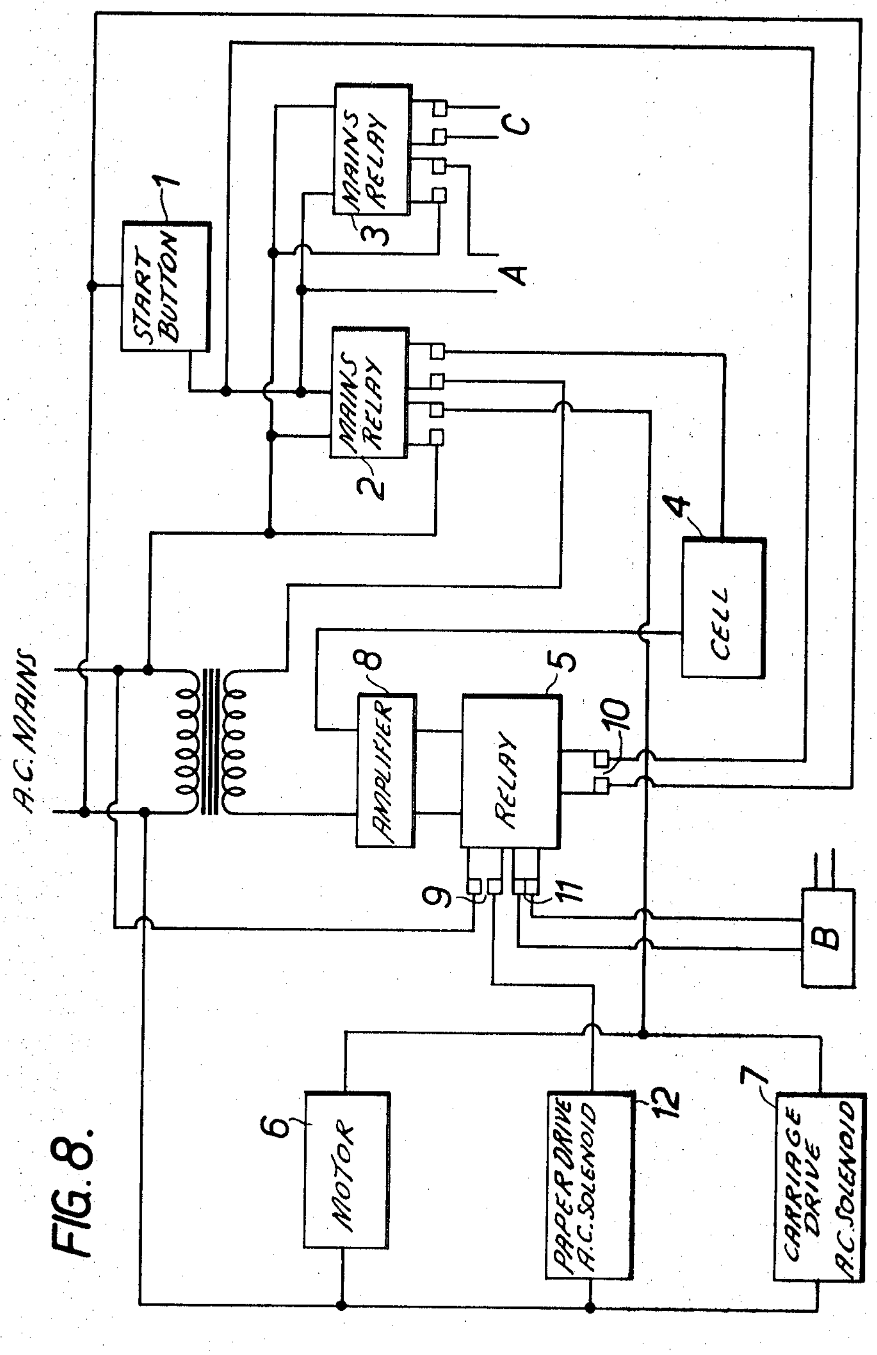
Figure 9:
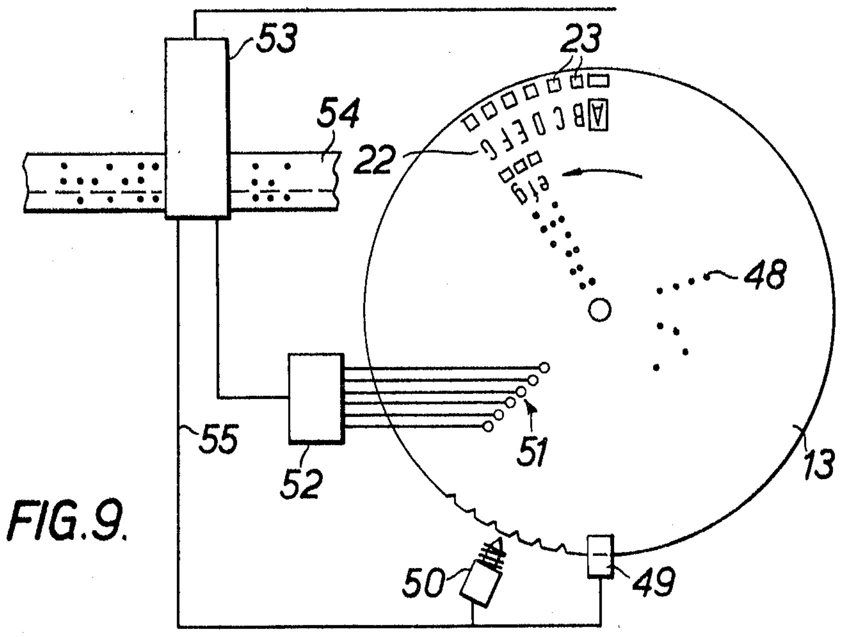
Figures 11, 12:
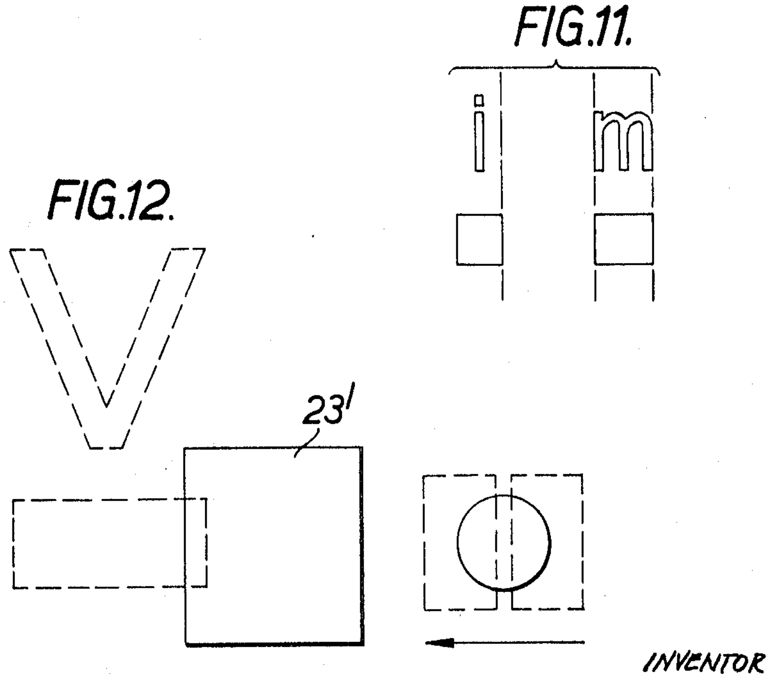
Figure 10:
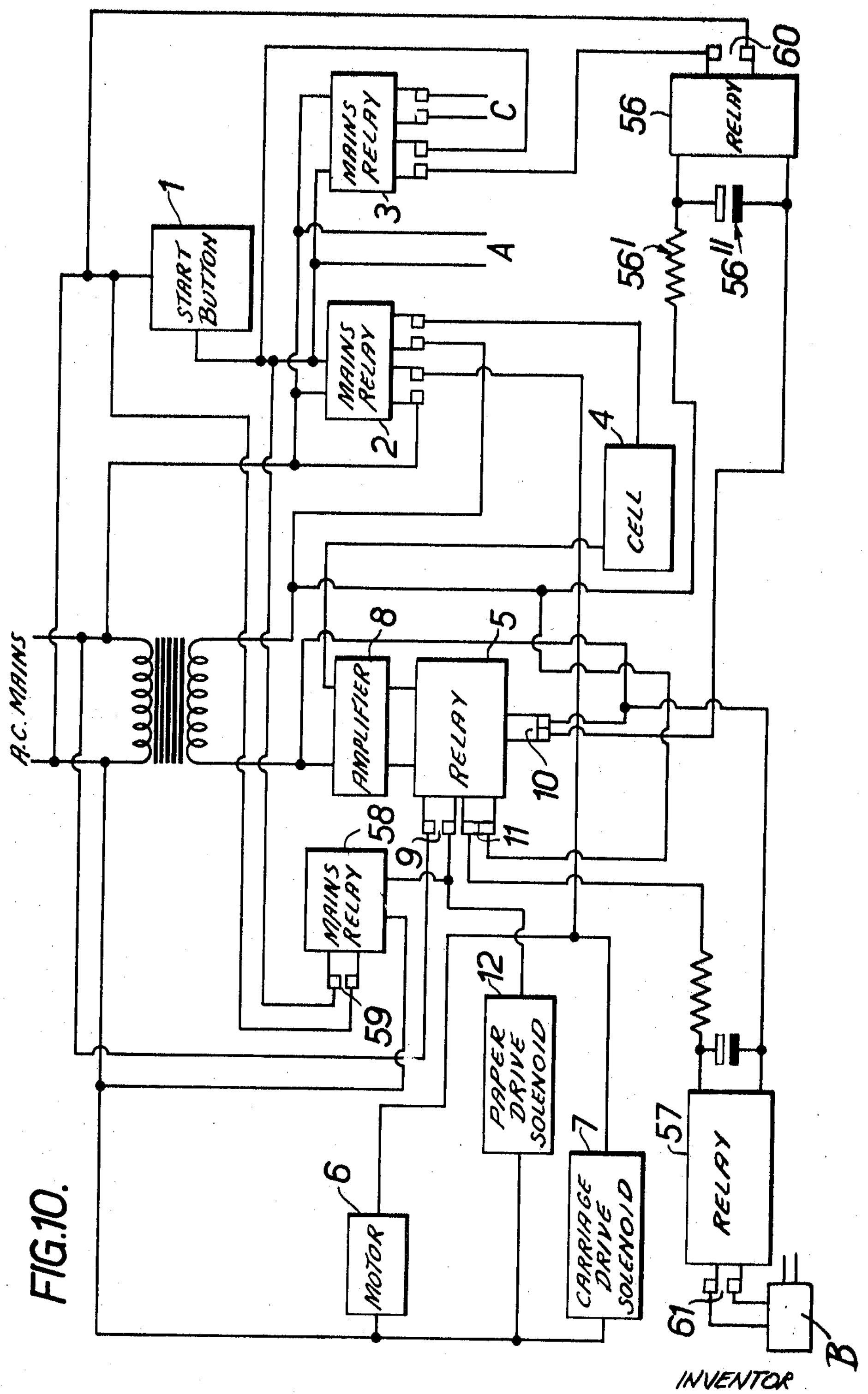
Figure 13:
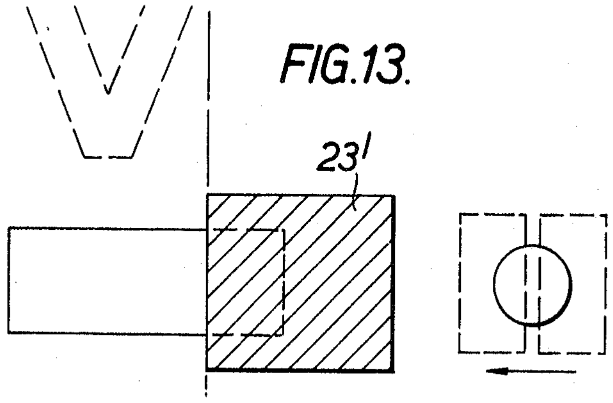
Figure 14:
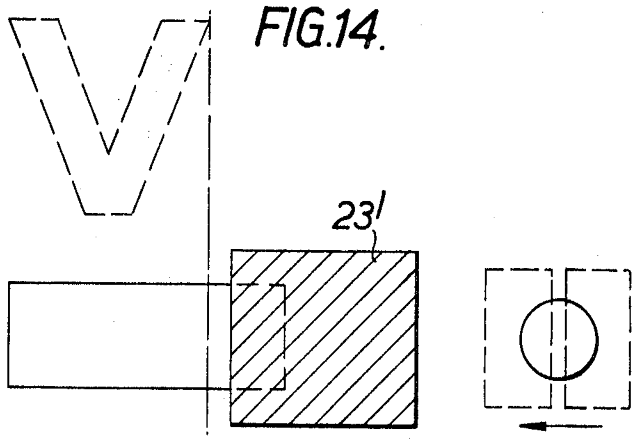
Figure 15:
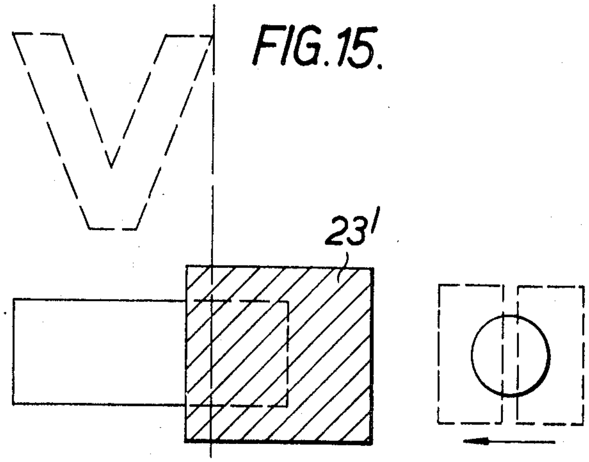
Figure 16:
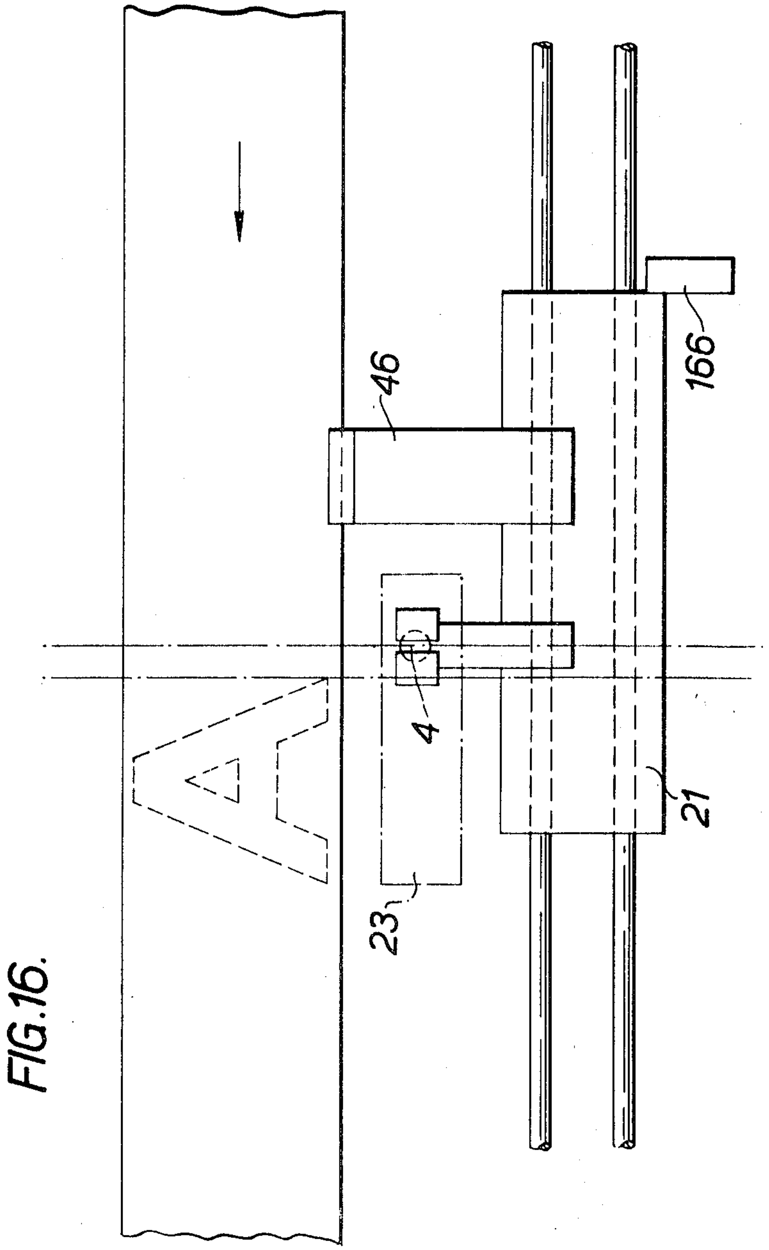
Figure 17:
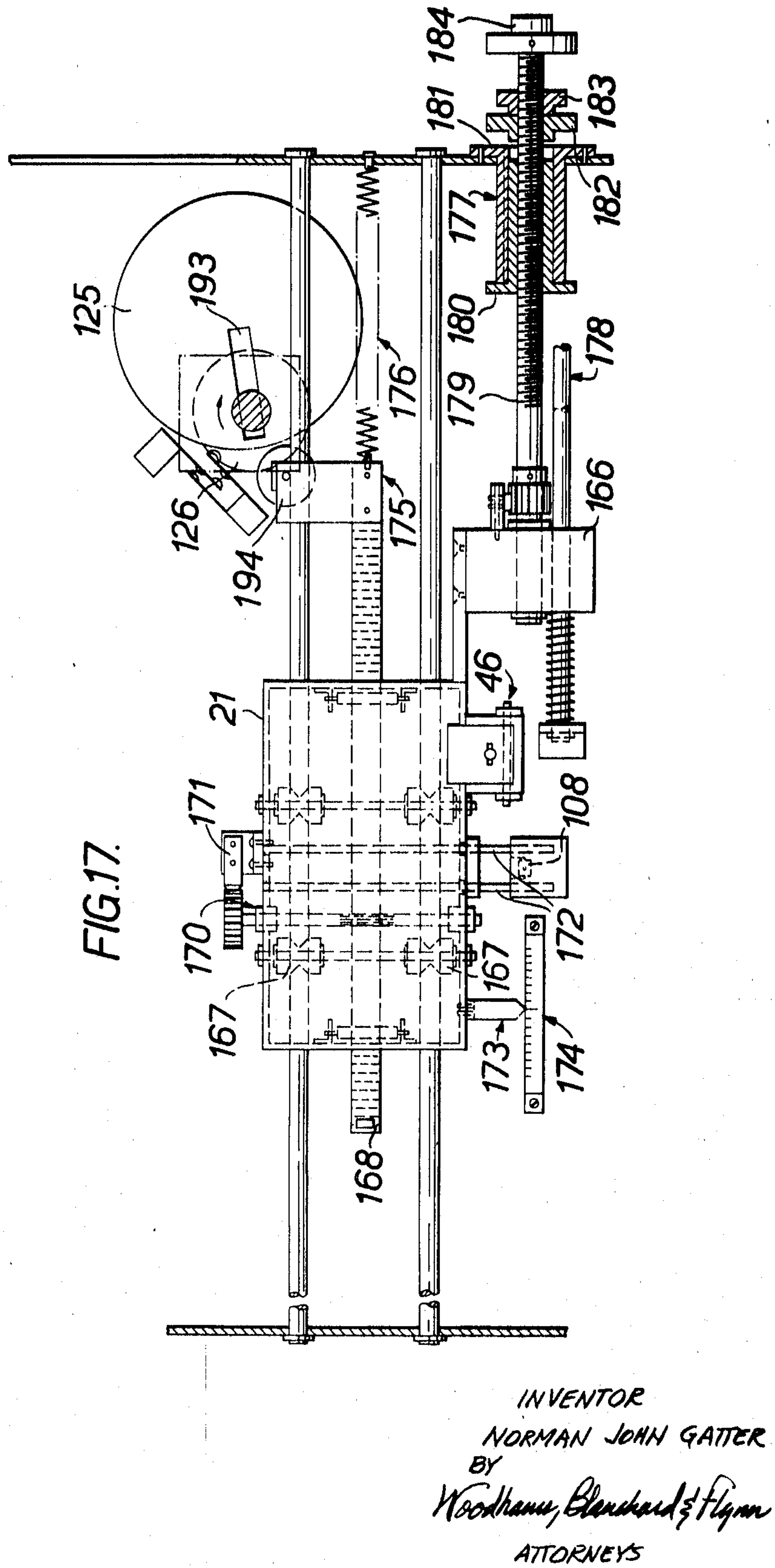
Figure 18:
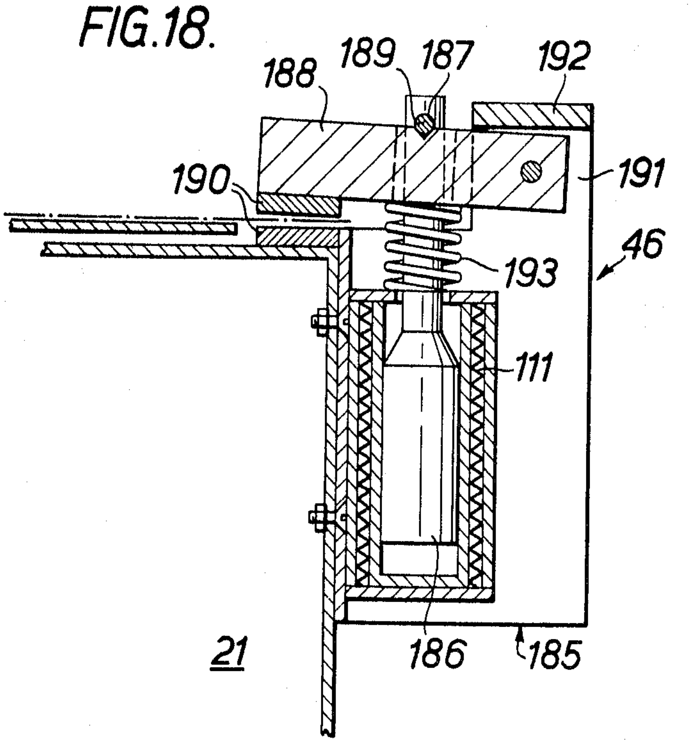
Figure 20:
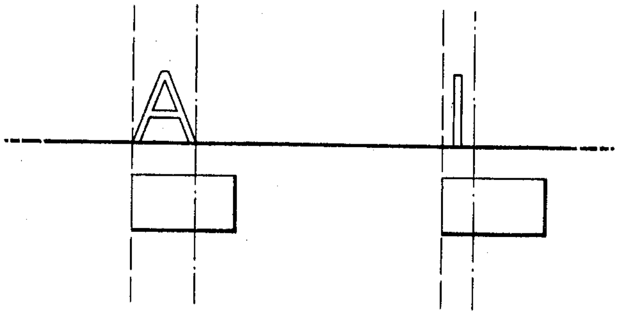
Figure 19:
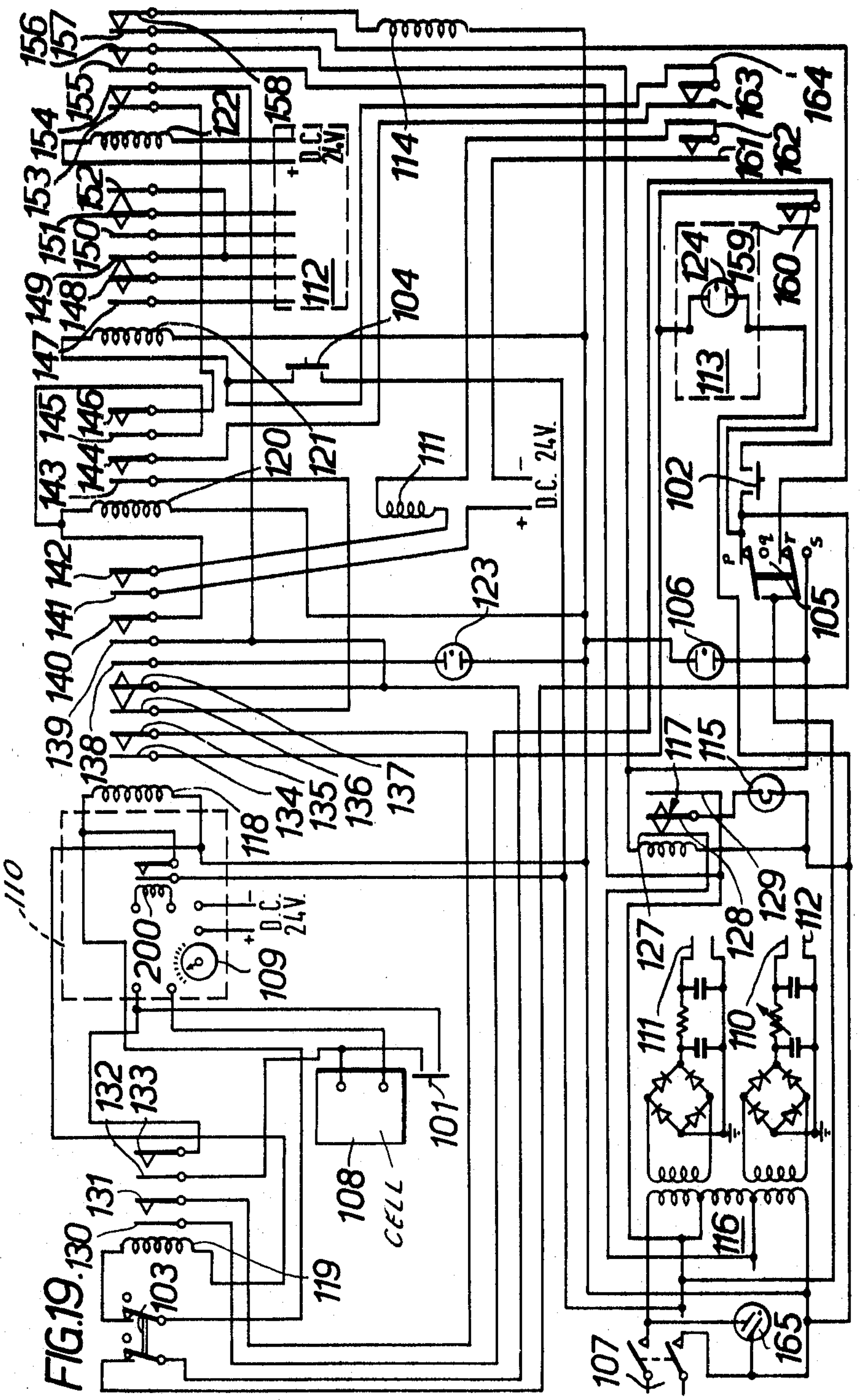

FIGS. 3*a* to 3*c* show three different operational positions of a shutter mechanism for the projection unit;

FIG. 4 is a plan view of a scanning unit;

FIG. 5 is a plan view of a drive mechanism for the scanning unit of FIG. 4;

FIG. 6 is an elevation of the recording paper transport mechanism;

FIG. 7 is a plan view of an alternative means of recording paper transport;

FIG. 8 is a circuit diagram of the electrical components of the apparatus;

FIG. 9 shows a further embodiment of a phototypesetting apparatus according to the invention;

FIG. 10 shows an alternative circuit diagram for use with the apparatus of the invention;

FIG. 11 shows a relationship between a character and its control marking;

FIG. 12 shows an embodiment similar to FIG. 11, but with a shield in place;

FIGS. 13, 14 and 15 shows an embodiment similar to FIG. 12 but with an adjustable shield in various positions and with the control window shown extended to the right of the character guide line;

FIG. 16 shows a modification of the scanning unit of FIG. 7;

FIG. 17 shows a plan view, partly in section, of a scanning mechanism of apparatus according to the invention;

FIG. 18 shows a vertical sectional elevation of a paper gripper mechanism according to the invention;

FIG. 19 shows a diagram of a circuit for operating the apparatus of the invention; and FIG. 20 shows an example of characters with their control windows extended to the right of the character guide line.

Figure 1:
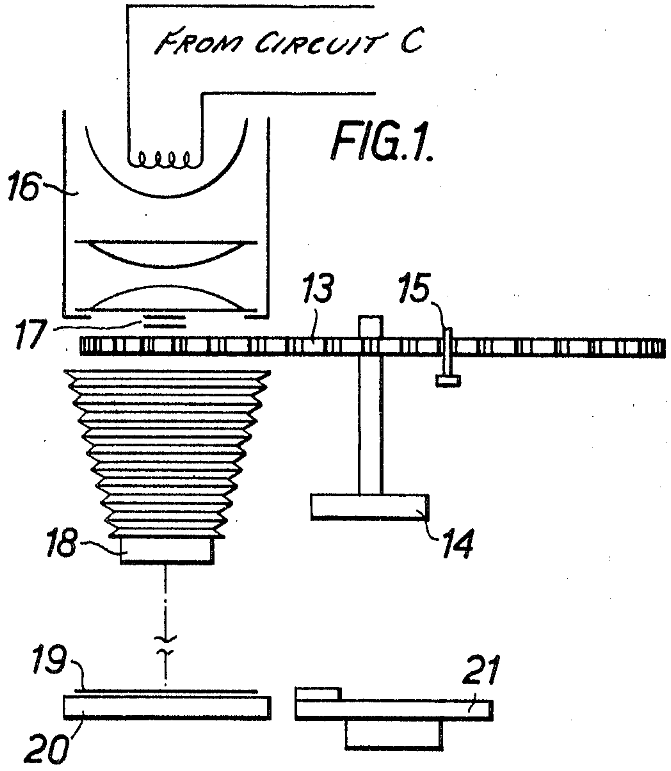
FIG. 1 is a general view of one embodiment of a phototypesetting apparatus according to the invention.

Referring to FIG. 1, the apparatus comprises a photographic type font disc 13 mounted on a notched support disc (not shown) rotatable by a wheel 14. The disc is biased to one of a number of positions by a spring loaded detent 15 which engages with notches in the edge of the disc. Part of the disc is illuminated by a lamp and condenser system 16, which is also provided with two safelight filters 17. An image of a character on the font is formed by the lens 18 on the recording paper 19, which is placed on the baseboard 20 of the apparatus. A scanning unit 21 is adjacent the recording paper.

Figure 2:
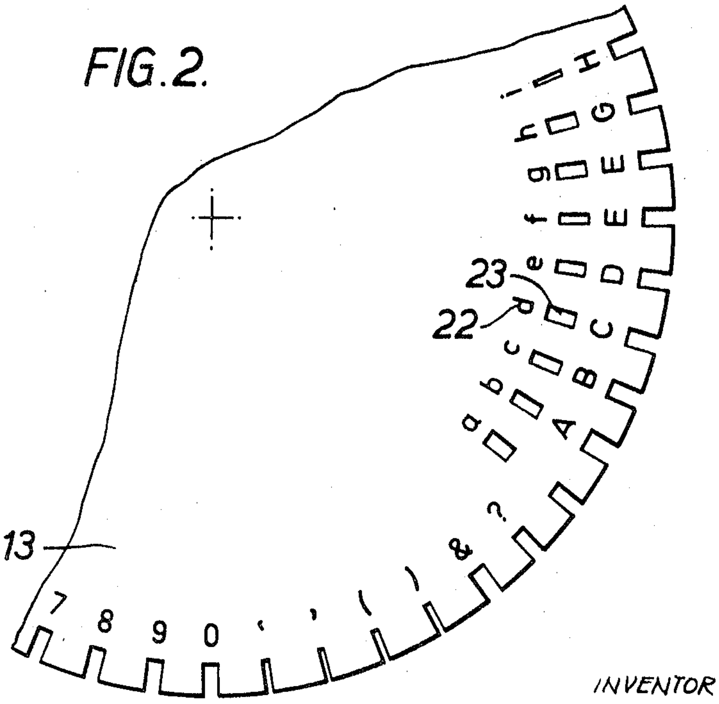
FIG. 2 shows part of an optical font separated from its notched support disc, and suitable for use in the apparatus of FIG. 1.

Referring to FIG. 2 which shows one form of font for use with the invention, the font is provided as a circular disc, suitably of polymethylmethacrylate, bearing an adherent piece of film on which characters are recorded in negative form. Each character image consists of two parts— the character 22 itself, and, adjacent the foot of the character, a clear panel or window 23 of the same width as the character above it. The distance between the character and its accompanying window is the same in all cases.

The outer edge of the optical font is provided with a plurality of notches (not shown), there being one notch for each character. The notches cooperate with a detent provided in the projector unit and permit precise indexing of a desired character.

The preparation of this optical font will now be described.

The transport disc, suitably of acrylic resin, is formed with a desired number of notches ground in its periphery. A piece of photosensitive film is then attached thereto and the disc is placed in the phototypesetting apparatus. One of the notches is engaged by the detent and a first character is placed on the illuminated baseboard of the machine so that its image is focused by the lens on the photosensitive film. The exposure is made and the disc is advanced one notch before repeating the process for the next character. In the cases of characters existing in upper and lower caseforms, the two forms are exposed separately, having moved the disc radially between the exposures.

Each character is so placed on the baseboard of the machine that its right-hand edge or extremity is adjacent an imaginary guide line and its bottom edge and is also adjacent a further imaginary guide line. Below the character there is placed an area of black paper having a fixed right-hand edge colinear with the first guide line. A white mask is slid over this paper until the visible left-hand edge of the black area is aligned with the left-hand edge of the particular character being photographed. There is thus produced a black area having a width equal to that of the character. This is photographed simultaneously with the character and produces the clear control window for that character on the optical font.

The projection unit comprises an illuminating head and two solenoid operated shutters (FIG. 3). The shutter 24 interposes a red filter over the whole area of the character 22 and its control window 23 (FIG, 3*a*), where as the other shutter 25 interposes a second red filter over the character alone during scanning of the control window (FIG. 3*b*). During exposure, neither filter is effective (FIG. 3*c*).

An image of the character and its control window is thrown on the baseboard of the apparatus. As seen in FIG. 4, the image 26 of the character falls on a strip 27 of photosensitive paper, suitably 2 inches wide.

The image 23 of the control window falls below the photosensitive paper, adjacent the scanning unit comprising a photoelectric cell 4 covered by a slit 29 of adjustable width and capable of being traversed at a constant speed across the image of the control window. The slit extends at right angles to the direction of motion of the cell. The light sensitive surface of the cell is positioned in the same plane as the recording paper so that when the image of the character is focused on the paper, an image of the control window will be focused in the same plane as the surface of the cell. By varying the width of the slit light may be allowed to enter the cell for a longer or shorter period.

The cell is mounted on a carriage 21 sliding on a guide rod 31. The carriage is driven leftwardly by tension in a cord 32, and is returned to its starting point by the cord 33, which is tensioned by a hanging weight (not shown).

FIG. 5 shows the cell carriage drive mechanism in greater detail. A shaft 34, driven by a motor (not shown) through reduction gearing, bears a gear 35. Adjacent the gear 35 is a further gear 36 fixed to a winding wheel 37 having the same diameter as a friction wheel driving the recording paper (see FIG. 6). The gear 36 and winding wheel 37 are free to slide on the shaft 34, and the gears 35 and 36 may be brought into engagement by energizing the solenoid 7, which acts through an arm 38. The wheel 37 is then rotated, winding up the cord 32 and driving the cell carriage leftwardly. A return spring 39 disengages the drive to the wheel 37 when the solenoid 7 is deenergized.

The paper transport mechanism (FIG. 6) comprises a drive wheel 40 on the same shaft 34 as the scanning drive winding wheel 37 (FIG. 5). When the cell 4 is illuminated the solenoid 12 is energized, the rocking member 41 is rotated about the fulcrum 42 against the action of the return spring 43, and the paper 27 is thus pinched between the drive wheel 40 and the idler wheel 41'. The paper 27 is driven leftwardly as long as the cell 4 is illuminated, and furthermore in this case is transported at the same linear velocity as the cell 4. When the slit over the cell 4 passes out of the image 23 of the control window (FIG. 4), the solenoid 12 is deenergized and the moving paper strip is brought to rest by being pinched between the rubber stop 44 and the paper support table 45.

FIG. 7 illustrates an alternative method of paper transport. Instead of the drive and idler wheels 40 and 43, the paper is gripped by electromagnetically operated jaws 46 attached to the cell carriage 21, which in this case is provided with two guides 31. When the cell 4 is illuminated by the image 23 of the control window (FIG. 4), the paper 27 is gripped by the jaws 46 and is carried along with the carriage 30. When the cell 4 passes out of the image of the control window, the jaws 46 open and further jaws 47 clamp the paper 27 to the support table 45.

The operation of the device is as follows:

For the sake of example, the situation will be considered in which part of a word has already been printed and a further character "X" is required. The font 13 is rotated to bring the required character into position in the projector unit. While this is being done, the red safe light filter 24 is in plane over the character and its associated control window.

Referring now to FIG. 8, the operational sequence is begun by depressing the delayed break start button 1, thus actuating mains relays 2 and 3. Relay 2 energizes the motor 6 which drives shaft 34, and solenoid 7, which engages the drive to the cell carriage 21 and causes it to begin moving towards the image 23 of the control window (see FIG. 4). Relay 2 also connects the cell 4 to the input of amplifier 8.

Relay 3 closes the points operating the circuit C which may be of any conventional construction and which steps up the projection illuminant to full brightness and simultaneously actuates a solenoid 24' (FIGS. 3*a* through 3*c*) controlling the shutter 24. The other contacts on relay 3 close circuit A which may be of any conventional construction and which actuates a solenoid 25' controlling the shutter 25. The shutters are now in the positions shown in FIG. 3*b*.

When cell 4 becomes illuminated, it operates relay 5 through amplifier 8, closing points 10 across the start button 1 which is now about to open. Points 9 on relay 5 actuate the paper drive solenoid 12 (or open the paper jaws 47 and close the paper jaws 46), and points 11 normally closed, now open. When the cell 4 has passed out of the illuminated image 23, relay 5 drops out, thus closing points 11 and breaking the supply to relays 2 and 3 and thereby moving the shutters to the position shown in FIG. 3*c*, as well as deenergizing the paper drive solenoid 12 (or closing the jaws 47 and opening the jaws 46). The latter actuate the circuit B of any conventional construction which exposes the character for a time determined by an electronic timer included therein. The cell carriage 21 meanwhile returns to a position of rest ready for the next cycle.

Since the cell 4 is traversed at the same speed as the paper, the paper is advanced a distance substantially equal to the width of the image 23 of the control window. By this means each character is given its correct spacing.

It will be understood that the control window may be made narrower than the character associated with it in which the cell would be scanned more slowly than the paper transport velocity. The spacing between letters may be varied by altering the width of the slit over the cell. Moreover, the image of the control window may be reflected to come to a focus away from the plane of the photosensitive recording paper. In this case the apparatus may be adapted to expose rectangular sheets of recording paper.

According to a further embodiment of the invention, the control windows are dispensed with and the character itself is scanned by a slit over the photoelectric cell.

Referring now to FIGS. 9 and 10, the phototypesetting apparatus comprises the optical font 13 having characters 22 each of which is associated with a window 23 for letter spacing control as before, the font also having in addition a coded address consisting of a linear array 48 of up to six clear dots, on a black film background. The address codes extend radially inward of the corresponding characters. The font is caused to turn in one direction by an electric motor, and situated at the outer edge of the font disc is a friction brake 49, electromagnetically operated via a relay, capable of stopping the disc very quickly. A solenoid-operated detent 50 is also provided, capable of engaging any of the notches in the edge of the font disc. When the font, as illustrated in FIG. 9, contains more than one band of characters, it is also necessary to provide powered means for displacing the font radially to select the desired band.

Adjacent the optical font is a fixed linear array of photosensitive elements 51, preferably phototransistors. A lamp on the other side of the optical font illuminates the cells when a clear dot forming part of an address code passes over the cell. Each cell is associated with an amplifying unit 52 and the amplified outputs from all the cells are fed to a logic unit 53.

The input to the phototypesetting apparatus is also supplied to the logic unit; the input may for example be derived from reading a punched tape 54 which has been punched on a keyboard punching apparatus of a known kind.

The logic unit 53 compares the output from the photosensitive elements 51 and the input from the punched tape reader and when these two signals are coding the same character, an output line 55 causes the motor driving the font to be deenergized, the electromagnetic brake 49 to be applied and released, and immediately afterwards, the solenoid operated detent 50 to be energized. The purpose of the brake 49 is to slow the disc down rapidly but smoothly while the detent 50 causes the disc to be located accurately by means of the notches, one of which is provided for each radial row of characters. The motor driving the font is restarted at the end of the exposure cycle. It is convenient for the code utilized for the optical font and that utilized for the punched tape to be identical. An input may also be derived from magnetic tape, from a suitable manually operated keyboard apparatus, or from a character reader of known type. This latter input means enables typewritten matter to be phototypeset automatically. The address codes on the optical font may also be in the form of magnetic areas.

Instead of having the address coding lines on the optical font itself, it is also possible to place them on a disc or drum fixed to the shaft bearing the optical font.

Referring now to FIG. 10 which is a circuit diagram of a phototypesetting apparatus similar to that described with reference to FIG. 8, the operational printing sequence is begun by switching current to mains transformer. As points 10 and 11 on relay 5 are normally closed current will flow to relays 56 and 57 causing their points 60 and 61 respectively, to close. Start button 1 is now pressed. Mains relays 2 and 3 are thus actuated. Relay 2 energizes motor 6 which drives shaft 34 and solenoid 7 which engages the drive to the cell carriage 30 and causes it to begin to move towards the image 23 of the control window. Relay 2 also connects the cell 4 to the input of amplifier 8.

Relay 3 closes the points operating circuit 'C,' which steps up the projection illuminant to full brightness and simultaneously actuates the solenoid controlling shutter 24. Current flowing to relay 3 also flows to circuit 'A' which actuates the shutter 25. The shutters are now in position shown in FIG. 3*b*.

The other points on relay 3 being now closed, start button 1 is held bridged.

When cell 4 become illuminated it operates relay 5 through amplifier 8, closing points 59 of relay 58 also bridging the start button 1. Points 10 now open, and after a brief pause created by a resistor 56' and a capacitor 56'' in circuit to relay 56, points 60 open thus breaking the circuit bridging start button 1.

Points 9 on relay 5 actuate paper drive solenoid 12 (or open paper jaws 47 and close paper jaws 46) and points 11, normally closed, now open. When cell 4 has passed out of illuminated image 23 of the control window (FIG 4), relay 5 drops out, thus breaking the supply to relays 2, 3 and 58, deenergizing the paper drive solenoid 12 and closing points 11. The latter, actuating relay 57 after a delay created by a resistor and capacitor in circuit, complete circuit 'B' through points 61 which exposes the character for a time determined by an electronic timer (not shown). The cell carriage 31 meanwhile returns to a position of rest ready for the next exposure cycle.

Referring now to FIG. 11 if it is desired to give an excessively narrow character a space between adjacent characters greater than normal to avoid a cramped appearance, it is only necessary to prepare its control window as though for a wider character as shown in FIG. 11 for the letter 'I'. The control window image is photographed with its right-hand edge colinear with the character guide line but the character itself, being narrower than, but vertically over the center of the window, has its right-hand edge leftward of the guide line.

Furthermore, it has been found that a neater appearance in the lettering is obtained when some characters are adjacent by tucking one under the other as, for example, by producing the word "over" in the form "oVer."

As illustrated in FIG. 12 of the accompanying drawings this is achieved by positioning an adjustable shield 23' at one end or the other of the projecting image of the control window or marking, so that its full width is prevented from being scanned by the cell. The shield is adjustable for the size of characters being projected and may be brought into use manually or in response to a signal from punched paper tape should a fully automatic machine be being used.

Additionally by altering the positions of both the control window and the adjustable shield from that when normal spacing is required additional space between characters may be provided or the characters may be caused to overlap the edge of adjacent characters.

The relative positions of character control window and adjustable shield for normal spacing, extra spacing and overlapping are illustrated in FIGS. 13, 14 and 15 of the drawings.

Thus for overlapping or tucking in, the adjustable shield is positioned with its left-hand edged to the left of the character guide line and the shield than only allows the required portion of the window image to be scanned (FIG. 15). For extra space between characters the left-hand edge of the adjustable shield is positioned to the right of the character guideline and the control window extended (FIG. 14) and for normal spacing the left-hand edge of the adjustable shield is in line with the character guide line (FIG. 13).

Referring now to FIGS. 16 to 19, there is shown a modified apparatus according to the invention. In this embodiment, shown in simplified plan view in FIG. 16, the control window 23 of each character, for example the capital 'A' shown, extend to the right, effectively to infinity, of the character guide line.

There is a carriage stop 166 adjustable in position which limits the return movement of the cell carriage after exposure of the character.

The font comprises characters with their right-hand edges having a relationship colinear with the vertical axis of the camera system used to record them. Thus the right-hand axis of the character may or not be coincident with the vertical axis of the recording camera, depending on the proportions of the characters concerned. Similarly, the bases of the characters are placed so that they may be coincident with the horizontal axis of the camera system. The control window or marking for each character is situated below that character as before, with the left-hand edge of the control marking in a fixed relation to the left-hand edge of the character, depending on the character, (FIG. 20). These left-hand edges are not necessarily coincident.

REferring now to FIG. 17, there is shown a detailed plan view of apparatus similar to that illustrated in FIG. 16 and adapted for semiautomatic operation.

The cell and gripper carriage 21 comprises guide wheels 167, a movable rack 168 with a hand operated pinion 170 locked in place when inoperative by a spring bladed pawl 171.

The photocell 108 is mounted on a pair of transverse guide rods 172 passing transversely through the body of carriage, which also carries a pointer 173 adjacent the cell which is adjusted with reference to a fixed scale 174 on the frame of the machine. One end of the rack carries a guide block 175 drilled to take one of the carriage rods and seating a cam follower 194. An eccentrically mounted cam 125 spaced from the follower is mounted for rotation on the same drive spindle of a motor (not shown) as a second smaller cam 126 which actuates a microswitch assembly 159—164 (see FIG. 19).

A carriage return spring 176 is connected between the frame of the apparatus and the rack guide block.

The adjustable carriage stop 166 is adjustable by a kerning mechanism 177 and is reciprocable on a pair of rails 178. The kerning mechanism comprises a central screw-threaded shaft 179 connected to the carriage stop and an inner and an outer bush 180 and 181 respectively coaxial with the shaft, the outer bush being attached to the frame of the apparatus. Intermediate the outer bush and a handwheel on the outer end of the shaft is a kerning adjuster 182 and a locknut 183.

When it is desired to alter the position of the carriage so that one character is photocopied whereby it overlaps another, the handwheel 184 is depressed to move the carriage 21 leftwardly until the kerning adjuster 182 abuts the face of the outer bush 181. Thus, the carriage starts its scanning cycle from a position leftwardly of the character guide line and the character is printed or copied in a space less than normal. The position of the adjuster 182 may be moved by releasing locknut 183.

In order to alter the normal spacing between characters when desired, the handwheel 184 is rotated, which thus moves the carriage stop 166 to a new position from which the carriage 21 starts its scanning cycle and indicated on the scale 174 by the pointer 173.

The cell 108 is movable inwardly and outwardly in relation to the carriage to allow for the case when characters are of greater or less than the standard size so that the cell may be repositioned to scan the image of the control marking.

The paper gripper 46 (FIG. 18) comprises a body portion 185 attached as by screwing to the cell carriage 21. A depending cylindrical member 186 is seated in a housing in the body portion, which housing is surrounded by a field coil 111. A top portion 187 of the cylindrical member passes through and orifice on a gripper arm 188 and is locked in place by a pivot pin 189. The gripper arm comprises jaws 190, and the end of the arm opposed to the jaws is pivoted in an upstanding lug 191 of the body. The sensitized paper passes between the jaws and is gripped when current passing through the coil 111 pivots the arm downwardly. When the current ceases to flow in the coil, a return spring 193 lifts the arm to open the jaws and release the paper, upward movement of the arm being limited by a stop member 192.

The apparatus of FIGS. 16—19 is shown without the use of the adjustable shield, previously described. In this case in the apparatus of FIGS. 16 to 19, no shield is used.

Also with this arrangement, great accuracy of character spacing is ensured since at the beginning of a machine operation cycle, the cell is illuminated before it begins to scan the image of the control window associated with the character it is desired to print. Since the window or marking extends to the right of the character, the output from the cell actuates the gripper solenoid 111 before any movement of the carriage takes place. The cell than returns at the end of each cycle to its initial position, until the carriage stop is moved to a new position, when desired.

The operation of the embodiment of FIG. 17 is as follows, reference being made to the circuit shown in FIG. 18.

AC mains switch 107 is switched on, illuminating a "Mains ON" indicator neon 165. AC Mains current now flows through manual exposure switch 105, contact *r*, and then passes through contacts 157 and 158 to hold the lamp shutter solenoid 114 closed. This holds a safelight filter in the light path of the lens system of illuminating head of the apparatus.

Since contacts 127 and 128 are closed, 110 VAC passes through the projector lamp 115. Also 24 VDC from a suitable power unit 116 is at the same time supplied to a cell amplifier 110 and to the circuit of the paper gripper solenoid 111, but as a lower cam 126 is at the position of rest since the motor 113 is not actuated, microswitch contacts 161 and 162 are open, as also are contacts 141 and 142, thus preventing paper gripper 46 from operating. Contacts 159 and 160 are also open.

Having selected the character on the font disc which it is desired to project, the cell and paper gripper carriage 21 is adjusted to come to rest leaving the cell in the correct position relative to the character guide line to achieve the spacing desired between characters and also in the illuminated area of the projected control window 23. The primer switch 101 is now depressed and cell sensitivity control 109 is adjusted, the illuminated cell 108 causing amplifier 110 to operate relays 118 and 119. The cell sensitivity control 109 is adjusted to allow the cell to operate the amplifier 110 only when in the illuminated control window area and not when the cell is outside it and illuminated solely by the ambient light surrounding the machine.

The cell 108 having been adjusted to operate correctly by using the primer switch 101 and cell sensitivity control 109, the relays 118 and 119 are actuated, and contacts 132 and 133 are closed, and hold the illuminated cell in circuit with the amplifier 110.

The contacts 130 and 131 join the circuit through the contacts 134 and 135 which are now closed to complete the line to the start switch 102 which is at present open.

The line current from the manual exposure switch 105, contact P, then is carried through the closed cancel switch 103 to contact 137. The relay 118 is actuated and contacts 136 and 137 now break and contacts 137 and 138 close to illuminate the neon 123. Contacts 139 and 140 now close to actuate relay 120. Contacts 141 and 142 now close to complete the circuit to paper gripper solenoid 111 up to the microswitch contacts 161 and 162 which are open as the lower cam 126 is at rest. The actuation of relay 120 closes contacts 143 and 144 and contacts 145 and 146 are also closed to complete a latching circuit round relay 120 through the normally closed contacts 153 and 154 and contact 139.

When the start switch 102 is depressed the circuit to the motor 113 is closed through the contacts 130 and 131 and 134 and 135 which have already been closed and the shaft on which are mounted both the lower cam 126 and the eccentric cam 125 and which is connected to the motor gearbox begins to turn. Microswitch contacts 159 and 160 and 161 and 162 now close and contacts 163 and 164 open.

Thus the AC circuit to motor 113 and the DC circuit to the paper gripper solenoid 111 are held closed and the sensitized paper is gripped.

The upper cam 125 rotates and when the space between the cam and follower is taken up begins to move the cell and paper gripper carriage leftward taking the sensitized paper with it.

When the cell reaches the left-hand end of the illuminated window projection area 23, it ceases to be illuminated and breaks the circuit to the amplifier 110, thus dropping out a slave relay 200 holding contact to relays 118 and 119 so that both of these drop out.

Contacts 141 and 142 now open to release the paper gripper solenoid 111, the sensitized paper having been moved the required amount. The paper is now held stationary by light pressured friction clamps to the paper transport table. Contacts 136 and 137 close and complete the circuit to the timer relay 121 but this will not operate until the lower cam 126 has completed its turning cycle to close the microswitch contacts 163 and 164. When the contacts 163 and 164 close, the relay 121 operates the timer circuit to actuate the relay 122 after a preset timing interval. Contacts 153 and 154 now open to release the latching circuit around the relay 120 which drops out. The contacts 155 and 156 close to relay 117 to step up the voltage to the projector lamp 115 to 230 v. and contacts 157 and 158 open thus breaking the circuit to the lamp shutter solenoid 114 through manual exposure switch 105.

Light from the projector now reaches the sensitized paper until the relay 122 has finished its timing sequence, whereupon contacts 157 and 158 close again to operate the lamp shutter solenoid 114.

If after initiating the cell amplifier circuit with the primer switch 101 the cancel switch 103 is depressed, the relay 119 will drop out and contacts 132 and 133 will open to break the circuit from the cell 108 to the amplifier 110. As cancel switch 103 is double-pole, the line to contact 139 is also broken, thus breaking the latching circuit to relay 120 through contacts 153 and 154 and 145 and 146. Thus contacts 143 and 144 are already open when cancel switch 103 is released, preventing current from flowing to relay 121 through contacts 136 and 137 which are now closed. The timer is therefore prevented from operating.

The timer only control switch 104 closes the circuit to relay 121 to enable the timer and the lamp shutter solenoid 114 to be worked independently from the rest of the circuit.

The manual exposure switch 105 is a double-pole single-throw switch having contacts p,q,r, and s which, when operated, breaks the circuit to both the motor 113 and lamp shutter solenoid 114 and connects the line to the relay 117.

This opens contacts 127 and 128 and closes contact 128 and 129 thus raising the projection lamp voltage to full brightness while the safelight filter in the lens system has been removed from the path of the light. The neon 106 is also illuminated to indicate manual exposure is being used.

The step-up and stepdown of voltage to the projection lamp is to overcome the problem of intense local heating on the condenser system of the illuminating head. This may be avoided by using a cold cathode in place of the condenser, in which case relays 128 and 129 are left out and the lamp burns at 230 volts all the time during a cycle.

Characters which require no movement of the paper, such as "umlauts" or other markings are printed without scanning a control marking and the timer only switch 104 is operated to initiate printing.

It is to be understood that while the left-hand side of the control marking and the left-hand side of the character have been shown as colinear, this need not be so, and these respective sides in fact have only a relationship one with the other depending on the proportions of the character.

The eccentrically mounted cam has a radially extending slot 193 in which the motor drive shaft is mounted so that by adjusting the cam in relation to the drive shaft, the distance the cam may move the carriage 21 during any cycle may be adjusted.

However, whatever distance the carriage is moved in different cycles, the time taken is the same in each case.

The illuminating head of the system used in all the embodiments of the invention comprises a head similar to an enlarger head, modified to receive on a central spindle the optical font. The head is adapted to swing away on rising butt hinges so that easy access may be had to the interior of the housing or head for removal ro changing the fonts.

It is also to be understood that the control marking may be covered by a safelight filter at all times during a cycle, since the photocell will still operate under these conditions.

It is also to be understood that the character guide line referred to in all the embodiments described is a line coincident with the vertical optical axis of the camera system used to record the character images, the vertical optical axis of the camera system being that which is at right angles to the baseline of the character images.

I claim:

1. An apparatus for phototypesetting comprising traversable means for scanning a projected image of a control marking associated with a character to be photocopied, and transport means responsive to the output of said traversable means for causing movement of a body having a photosensitive surface thereon, said transport means comprising electromagnetically operated clamping means, the output from the traversable means actuating a relay in an electrical circuit to open a first clamping means and close a second clamping means to the photosensitive surface adjacent the traversable means, the photosensitive surface than being moved at the same velocity as the traversable means while said traversable means scans a selected lateral width of the control marking, the first clamping means closing on the body and the second clamping means opening when the traversable means passes beyond the image of the control marking, whereby the said relay then drops out to actuate illuminating means whereby to expose the said character associated with the control marking.

2. An apparatus according to claim 1, in which the image of the control marking comprises a rectangular area of substantially greater width than the character to be photocopied, the traversable means scanning laterally along the image of the control marking.

3. An apparatus according to claim 2, in which said traversable means scans from a point intermediate one lateral extremity of the character to be photocopied and the adjacent extremity of the control marking of said character towards which the scanning means is moving so that the distance between the character to be photocopied and an immediately preceding character is determined.

4. An apparatus according to claim 2, in which the distance between adjacent characters is adjusted by means including adjustable screen means, the screen means being initially adjusted in position over a part of the control marking which it is desired to blank off, the traversable means then first scanning under the screen and subsequently scanning the remaining portion of the control marking while being exposed to the electromagnetic radiation so that the photosensitive surface is transported the required determined distance.

5. An apparatus according to claim 1, in which the photosensitive surface is transported substantially at the same speed as the traversable means, and said traversable means is then actuated by the electromagnetic radiation when it scans a control marking to emit an output which actuates clamping means and the photosensitive surface is clamped in position so that the character to be photocopied may be exposed.

6. An apparatus according to claim 1, in which the traversable means returns to its initial position after scanning the image of the control marking.

7. An apparatus according to claim 1, in which the image of the character and the image of the control marking are projected into the same plane by said illuminating means, the characters, each with its associated control marking, being arranged sequentially on an optical font which is rotated when required so that a desired character is exposed.

8. Apparatus for phototypesetting comprising a projector unit coacting with an optical font in which each character is associated with a control marking having a width related to the desired amount of space in which the character is to be printed, transport means for moving a material having a photosensitive surface, for example, a photosensitive film or paper strip, and scanning means for scanning a control marking and for controlling said transport means whereby the transport means advances the photosensitive material a determined distance in proportion to the scanned width of the control marking before said material is exposed to said character, thus ensuring that each character is allotted a suitable space on the photosensitive material.

9. Apparatus according to claim 8, in which the scanning means comprises a photosensitive cell, a reciprocable carriage having the cell mounted thereon, and an electrical circuit adapted to actuate the transport means and advance the photosensitive material in response to a signal from the scanning means.

10. Apparatus according to claim 8, in which the transport means comprises a motor, a first clamping part mounted on and rotatable with a drive shaft of the motor, the shaft being displaceable in the direction of its longitudinal axis, and a second clamping part opposed to the first clamping part such that the photosensitive film or paper passes between the first and second clamping parts, and the second clamping part is pivotable under the action of a solenoid to engage the film or paper between the clamping parts so that it is transported the required distance.

11. Apparatus according to claim 9, in which the transport means comprises a clamping means situated adjacent an edge of the carriage and adapted to grip an edge of the film or paper, which is thereby moved with the carriage.

12. Apparatus according to claim 11, in which the clamping means comprises a body portion attached to the cell carriage, a field coil in the body, a cylindrical core portion forming with the coil a solenoid, a top part of the core passing through a hole in a gripper arm which extends towards the film or paper at an angle of substantially 90° to the core portion and is pivoted at a point opposed to a gripper portion of the arm in an upstanding lug on the body portion, a compression spring normally urging the gripper portion away from the film or paper, so that when the solenoid is actuated, the pressure of the spring is overcome and the gripper arm pivots to clamp an edge of the film or paper.

13. Apparatus according to claim 12, and including a stop member mounted above the pivot of the gripper arm, the said top member obviating excessive rotation of the gripper part of the arm away from the plane of the film or paper.

14. Apparatus according to claim 9, in which the reciprocable carriage is mounted on guide wheels running on parallel guide rails attached to a frame of the apparatus, a rack extending the length of the carriage and attached to a return spring, the rack adjacent the spring seating a guide block in which is rotatably mounted a cam follower adapted to be engaged by an eccentrically mounted cam, so that on rotation of the cam the carriage is moved along the guide rails and the photocell scans the image of the control marking.

15. Apparatus according to claim 14, including an adjustable carriage stop adapted to be moved in position relative to the cam so that the position from which the carriage starts its traverse is adjustable.

16. Apparatus according to claim 8, in which the control marking has a width substantially greater than the maximum width of the character to photocopied.

17. Apparatus according to claim 8, in which the control marking has a width substantially equal to the maximum width of the character to be photocopied.

18. Apparatus according to claim 8, in which the optical font is rotatably mounted in an illuminating head adapted to project the image of the character and its control marking, the illuminating head including automatically retractable safelight shutters effective to protect the photosensitive film from exposure during scanning and transport of the film or paper.

19. A method of phototypesetting, comprising the steps of providing a member having a character thereon and a control marking associated with said character, providing a material having a photosensitive surface thereon adapted to have a projected image of the character reproduced on the photosensitive surface, scanning said member and particularly the control marking thereon in a lateral direction from a selected point thereof, and moving the photosensitive material a determined distance proportional to the scanned distance of the control marking during the time interval in which the control marking is scanned, whereby a character adapted to be projected on said photosensitive material is spaced from a preceding character by said determined distance.